United States Patent
Kunz et al.

(10) Patent No.: US 10,391,992 B2
(45) Date of Patent: Aug. 27, 2019

(54) BRAKING METHOD FOR A MOTOR VEHICLE AND CONTROL DEVICE FOR A BRAKING METHOD

(71) Applicant: Robert Bosch GmbH, Stuttgart (DE)

(72) Inventors: Michael Kunz, Steinheim an der Murr (DE); Tobias Putzer, Bad Friedrichshall (DE)

(73) Assignee: Robert Bosch GmbH, Stuttgart (DE)

(*) Notice: Subject to any disclaimer, the term of this patent is extended or adjusted under 35 U.S.C. 154(b) by 173 days.

(21) Appl. No.: 15/502,138

(22) PCT Filed: Jun. 18, 2015

(86) PCT No.: PCT/EP2015/063690
§ 371 (c)(1),
(2) Date: Feb. 6, 2017

(87) PCT Pub. No.: WO2016/020095
PCT Pub. Date: Feb. 11, 2016

(65) Prior Publication Data
US 2017/0240156 A1 Aug. 24, 2017

(30) Foreign Application Priority Data
Aug. 8, 2014 (DE) .................. 10 2014 215 798

(51) Int. Cl.
*B60T 13/58* (2006.01)
*B60T 13/74* (2006.01)
(Continued)

(52) U.S. Cl.
CPC .............. *B60T 13/588* (2013.01); *B60T 7/12* (2013.01); *B60T 8/171* (2013.01); *B60T 8/176* (2013.01);
(Continued)

(58) Field of Classification Search
CPC ........ B60T 13/588; B60T 8/171; B60T 8/176; B60T 13/741; B60T 7/12; F16D 2121/24; F16D 65/18
(Continued)

(56) References Cited

U.S. PATENT DOCUMENTS 5,139,315 A    8/1992  Walenty et al.
6,582,030 B2 *  6/2003  Harris .................... B60T 7/042
                                                        303/15
(Continued)

FOREIGN PATENT DOCUMENTS

CN    102390375 A    3/2012
CN    103492245 A    1/2014
(Continued)

OTHER PUBLICATIONS

International Search Report corresponding to PCT Application No. PCT/EP2015/063690, dated Jan. 26, 2016 (German and English language document) (5 pages).

*Primary Examiner* — Melanie Torres Williams
(74) *Attorney, Agent, or Firm* — Maginot, Moore & Beck LLP

(57) ABSTRACT

A braking method is used for a vehicle that has at least one front wheel and at least one rear wheel. A hydraulically actuatable brake is provided at the front wheel and the rear wheel, and an automatic parking brake is provided at the rear wheel. The braking method enables an optimal brake pressure to be built up as rapidly as possible. In a first step of an initiation phase of the braking method, the front wheel is braked by the hydraulically actuatable brakes and the rear wheel is braked exclusively by the automatic parking brake.

15 Claims, 3 Drawing Sheets

(51) Int. Cl.
*B60T 7/12* (2006.01)
*B60T 8/171* (2006.01)
*B60T 8/176* (2006.01)
*F16D 65/18* (2006.01)
*B60T 8/32* (2006.01)
*F16D 121/24* (2012.01)

(52) U.S. Cl.
CPC ............ *B60T 13/741* (2013.01); *F16D 65/18* (2013.01); *B60T 8/3275* (2013.01); *F16D 2121/24* (2013.01)

(58) Field of Classification Search
USPC .......................................................... 303/155
See application file for complete search history.

(56) References Cited

U.S. PATENT DOCUMENTS

| | | | | |
|---|---|---|---|---|
| 7,121,633 | B2* | 10/2006 | Tachiiri | B60T 7/107 303/20 |
| 9,132,812 | B2* | 9/2015 | Treppenhauer | B60T 7/122 |
| 9,457,783 | B2* | 10/2016 | Kotake | B60T 13/741 |
| 2008/0053760 | A1* | 3/2008 | Oikawa | B60T 13/745 188/72.4 |
| 2009/0256417 | A1* | 10/2009 | Ishii | B60T 8/267 303/152 |
| 2010/0025141 | A1* | 2/2010 | Bensch | B60T 8/327 180/271 |
| 2010/0072811 | A1* | 3/2010 | Kondo | B60T 13/588 303/20 |
| 2013/0162010 | A1* | 6/2013 | Koyama | B60T 13/142 303/6.01 |
| 2014/0095042 | A1* | 4/2014 | Sakashita | B60T 13/588 701/70 |
| 2014/0151164 | A1* | 6/2014 | Yokoyama | B60T 1/065 188/72.3 |
| 2014/0202801 | A1* | 7/2014 | Berger | B60T 13/588 188/106 P |

FOREIGN PATENT DOCUMENTS

| | | |
|---|---|---|
| CN | 203601251 U | 5/2014 |
| EP | 1 686 029 A1 | 8/2006 |
| JP | 2003-165428 A | 6/2003 |
| JP | 2009-166656 A | 7/2009 |
| JP | 2013-154674 A | 8/2013 |
| JP | 2013-173538 A | 9/2013 |
| JP | 2013-244800 A | 12/2013 |
| JP | 2014-19233 A | 2/2014 |

* cited by examiner

BRAKING METHOD FOR A MOTOR VEHICLE AND CONTROL DEVICE FOR A BRAKING METHOD

This application is a 35 U.S.C. § 371 National Stage Application of PCT/EP2015/063690, filed on Jun. 18, 2015, which claims the benefit of priority to Serial No. DE 10 2014 215 798.6, filed on Aug. 8, 2014 in Germany, the disclosures of which are incorporated herein by reference in their entireties.

The present disclosure relates to a braking method for a motor vehicle and to a control device for a braking method.

BACKGROUND

Driving has become increasingly automated in recent years. A portion of this automation also takes place, in particular, in the area of intervening in emergency situations. These are situations, for example, in which the driver is distracted or runs up against the limits of his driving abilities. In this case, for example, the vehicle is automatically braked if a collision is imminent, in order to reduce the kinetic energy to the greatest extent possible, as soon as possible. First, an emergency situation is detected by means of an appropriate sensor system; the implementation of the emergency braking is then generally carried out by the ESP (electronic stability program), since this is capable of independently building up the required brake pressure at each wheel of the vehicle.

In conventional systems, however, the vehicles are braked purely hydraulically by means of the service brake. In order to build up the optimal (maximum) brake pressure as rapidly as possible, the hydraulic system must be dimensioned accordingly, which can result in high costs.

The problem addressed by the present disclosure is therefore that of providing a braking method and a control device for a braking method, by means of which an optimal brake pressure can be built up as rapidly as possible, in particular in an emergency braking procedure, wherein the system should be realized as cost-effectively as possible.

This problem is solved by the features disclosed herein. Refinements of the disclosure are described in the following description.

SUMMARY

According to the disclosure, a braking method for a vehicle comprising at least one front wheel and at least one rear wheel is provided, wherein a hydraulically actuatable brake is provided at the front wheel and the rear wheel and an automatic parking brake is provided at the rear wheel, wherein, in a first step of an initiation phase of the braking method, a braking force is generated at the front wheel by means of a hydraulic brake pressure present at the hydraulically actuatable brake and a braking force is generated at the rear wheel exclusively by means of an electrical actuator of the automatic parking brake. This is intended to mean that the rear wheel is braked only by means of the parking brake. A build-up of hydraulic brake pressure is not provided in this step. The total potential for building up a hydraulic brake pressure (in particular a pumping capacity of the ESP system) can therefore be utilized for generating braking force at the front wheel. In addition, it should be noted that multiple front wheels, in particular two front wheels, and/or multiple rear wheels, in particular two rear wheels, can also be present on the vehicle, of course. According to the disclosure, therefore, in a first step of the initiation phase, the rear wheels—or the rear axle—are/is braked exclusively by means of the parking brake and the total potential for building up a hydraulic brake pressure is utilized at the front wheels or the front axle. In this case, each wheel can be equipped with a separate hydraulically actuatable brake.

Generating a braking force is considered to mean the build-up as well as the holding and the variation or modulation of the braking force. In the case of an actuation of a hydraulically actuatable brake by means of a hydraulic brake pressure, in particular within the scope of a generation of a braking force, reference can also be made to a hydraulically actuated brake.

The the total pumping capacity can therefore be used exclusively for generating a braking force at the front wheel (or at the front wheels or the front axle). In this case, it should be noted that the front wheel (or the front wheels or the front axle) is highly significant in terms of the deceleration of the vehicle longitudinal motion in forward driving and makes a substantial contribution to the deceleration potential. In addition, a very high pressure can be built up by the hydraulic system. Automated braking interventions, e.g., in emergency situations (emergency braking) can be realized substantially more rapidly in this way. The total braking potential is also increased, since a second independent actuator (automatic parking brake) assists the brake control interventions. In this way, the safety of the automatic braking intervention is increased.

For vehicles having sufficiently high capability with respect to the hydraulic system (brake system), the system costs can be lowered. For example, the hydraulic capacity can be reduced, which results in cost savings. These advantages are achieved, in particular, by way of the second independent actuator being used for assisting the hydraulic actuator (ESP).

Advantageously, in a downstream, second step of the initiation phase of the braking method for generating a braking force, a hydraulic brake pressure is additionally built up at the hydraulically actuatable brake at the rear wheel as soon as a defined brake pressure has been reached at the hydraulically actuatable brake at the front wheel. A brake pressure can be advantageously defined, in this case, as the pressure at which the hydraulically actuatable brake at the front wheel transitions into an ABS control.

Advantageously, in a further downstream, third step of the initiation phase of the braking method, the braking force at the front wheel and the braking force at the rear wheel are generated exclusively by means of a hydraulic brake pressure in the hydraulically actuatable brakes as soon as a defined brake pressure has been reached in the hydraulically actuatable brake at the rear wheel. A brake pressure can be advantageously defined, in this case, as the pressure at which the built-up brake pressure is great enough to provide a required braking force only at the rear wheel.

By means of the three steps of the initiation phase of the brake system, the braking is advantageously incrementally transferred to the hydraulic brake system. This makes it possible for the hydraulic brake system, i.e., the pressure potential which can be generated, to be focussed on the front wheels for the first step of the initiation phase. As a result, it is made possible, in particular, to build up the hydraulic brake pressure at the front wheels as rapidly as possible.

The described initiation phase of the braking method, in which the automated braking is initiated, is preceded by a preparation phase which, in particular, the three steps "filling the hydraulically actuatable brakes with hydraulic fluid and placing the brake pads against the brake disks" and "transmission (i.e., passing through or overcoming) of idle travel and clearance of the automatic parking brake" and "holding phase, in which the applied brake pads and filled, hydraulically actuatable brakes are held in the activated position".

Advantageously, the brake pads of the hydraulically actuatable brakes at the front wheel and/or rear wheel are placed against the brake disks of the hydraulically actuatable brakes at the front wheel and/or rear wheel in a step of a preparation phase of the braking method upstream from the initiation phase. As a result, a clamping force between the brake pads and the brake disk can be generated as rapidly as possible, if necessary, by means of the hydraulic brakes.

Advantageously, in a further step of the preparation phase of the braking method, play and/or clearance of the automatic parking brake is overcome, in order to thereby permit a clamping force between the brake pads and a corresponding brake disk to be generated as rapidly as possible, if necessary.

Advantageously, the brake pads are placed against the brake disks in such a way that, as a result, essentially no braking force is applied or a braking force which is applied is as low as possible, in order to not generate a premature, i.e., unwanted and/or uncontrolled braking of the vehicle.

The described initiation phase of the braking method, in which the automated braking is initiated, is followed by a completion phase.

Advantageously, in the downstream completion phase of the braking method, a distinction is made between different situations which are present at the point in time of the completion phase, and the braking method is adapted thereto. In a first situation, in particular when the vehicle is at a standstill, the vehicle is hydraulically held in place and, after a defined period of time, is turned over to the automatic parking brake, in order to continuously and reliably park the vehicle. In an alternative situation, in particular when the vehicle is in motion, the hydraulically actuatable brakes are released and the vehicle (i.e., the steering and control of the vehicle) is handed over to the driver. This can be carried out by the driver, for example, when the emergency braking is terminated. In one further alternative situation, in particular when a collision has occurred, the vehicle, which is held in place by the hydraulic brakes, is transferred to the automatic parking brake, in order to continuously and reliably hold the vehicle at a standstill.

Advantageously, the braking force generation takes place in an automated way within the scope of the braking method, in order to enable braking force to be generated independently of an intervention by the vehicle driver.

Advantageously, the braking method is an emergency braking method which is initiated as soon as predetermined indicators for an emergency braking situation are present and/or detected in a detection phase of the braking method. The detection phase advantageously precedes the preparation phase in this case.

Advantageously, the braking method is utilized in a vehicle which is in motion, in particular in a vehicle which is being operated by a vehicle driver.

Furthermore, a control unit is provided, which is designed and comprises means for carrying out the described method. A corresponding automatic parking brake is also provided, which, advantageously, is a "motor on caliper" brake system.

BRIEF DESCRIPTION OF THE DRAWINGS

Further features and practicality of the disclosure result from the description of exemplary embodiments with reference to the attached figures.

In the figures.

DETAILED DESCRIPTION

Figure 1:
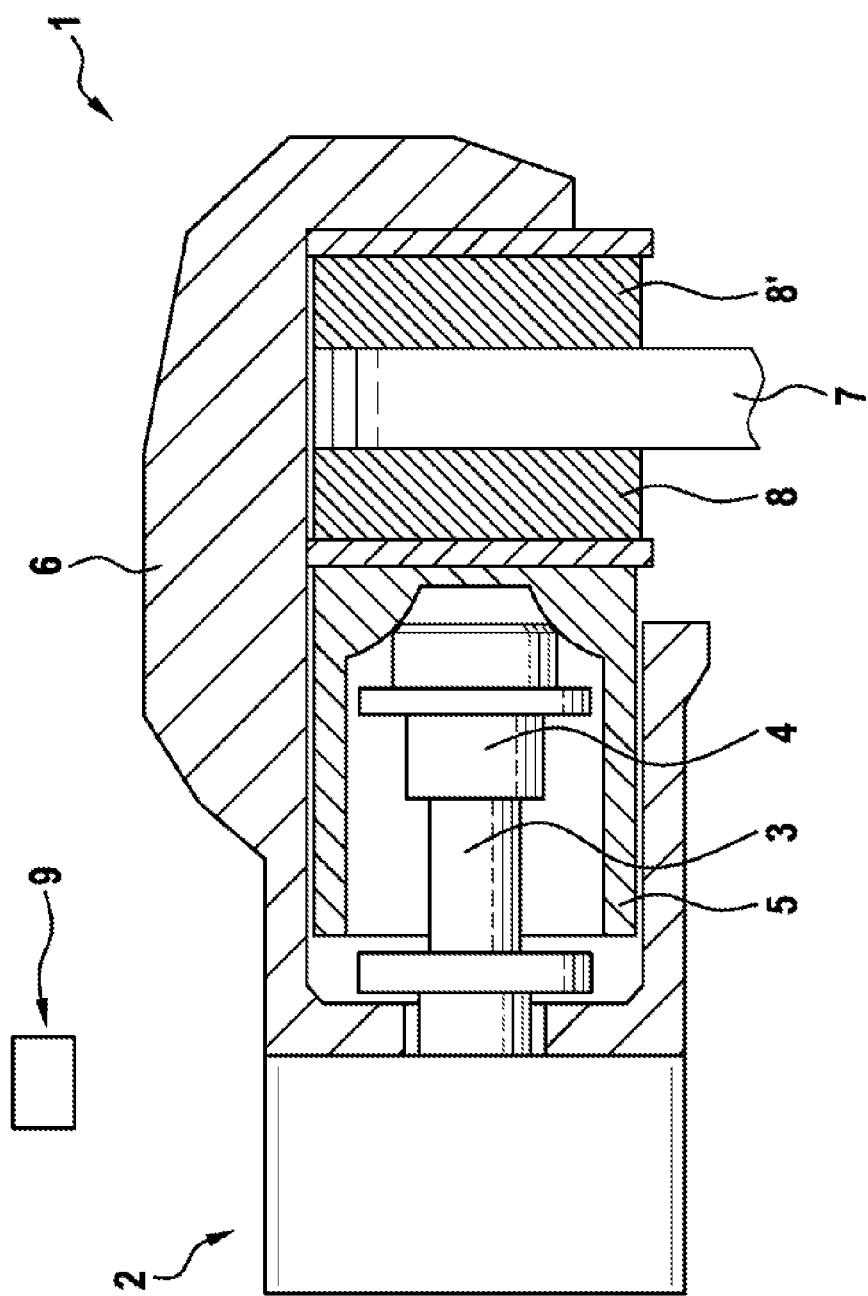
FIG. 1 shows a schematic sectional view of an automatic parking brake having a "motor on caliper" design.

FIG. 1 shows a schematic sectional view of an automatic (automated) parking brake (hand brake) 1 for a vehicle, which can apply a clamping force for holding the vehicle by means of an actuator 2 (brake motor) which is designed as a direct-current motor in this case. The actuator 2 drives a spindle 3, in particular a threaded spindle 3, which is mounted in an axial direction. On the end thereof facing away from the actuator 2, the spindle 3 is provided with a spindle nut 4 which, in the clamped state of the automatic parking brake 1, rests against an inner end face or a back side of a brake piston 5. The spindle nut 4 is displaced in the axial direction during a rotary motion of the actuator 2 and a resultant rotary motion of the spindle 3. The spindle nut 4 and the brake piston 5 are mounted in a brake caliper 6 which engages over a brake disk 7 in the manner of a gripping device. One brake pad 8, 8' is situated on either side of the brake disk 7. In the case of a clamping procedure of the automatic parking brake 1, the electric motor (actuator 2) rotates, whereupon the spindle nut 4 and the brake piston 5 are moved in the axial direction toward the brake disk 7, in order to thereby generate a predetermined clamping force between the brake pads 8, 8' and the brake disk 7. The automatic parking brake 1 is integrated, e.g., as a "motor on caliper" system, into the service brake; in the event of braking using the service brake, the predetermined clamping force between the brake pads 8, 8' and the brake disk 7 is hydraulically built up.

The control of the actuator 2 takes place by means of the control unit 9, which can be, for example, a control unit of a vehicle dynamics system, such as ABS (antilock brake system), ESP (electronic stability program), or any other type of control unit, e.g., an EHB (electrohydraulic brake).

One embodiment of the present disclosure is described in the following with reference to the figures.

According to the present disclosure, a braking force is initially built up at the brakes on a front axle or the front wheels of a vehicle purely hydraulically, in particular by means of the ESP, in particular in the event of emergency braking or the automated intervention in an emergency situation. The generation of braking force at the brakes on a rear axle or the rear wheels of the vehicle is initially carried out by the automatic parking brake 1, i.e., said braking force is electromechanically generated by an actuator of the automatic parking brake. This system combination of ESP and the automatic parking brake 1 results in a performance gain, since both systems are capable of building up—even independently of each other—a braking torque which results in a vehicle deceleration. A hydraulic brake pressure is built up by the ESP and a clamping force is generated by the automatic parking brake 1, which acts between the brake pads 8, 8' and the brake disk 7 of the corresponding brake.

By means of a suitable valve control, the entire pump capacity of a hydraulic pump of the ESP can be utilized for building up brake pressure at the brakes on the front axle. In this way, a very rapid build-up of brake pressure at the brakes on the front axle can be achieved. The hydraulic clamping force $F_{klemm, hyd}$, which acts on a wheel or between the corresponding brake pads 8, 8' and the brake disk 7, can be calculated by means of the following equation:

$$F_{klemm, hyd} = p_{Rad} * A_K,$$

wherein $p_{Rad}$ is the hydraulic wheel brake pressure and $A_K$ is the piston area of the brake piston 5.

Figure 2:
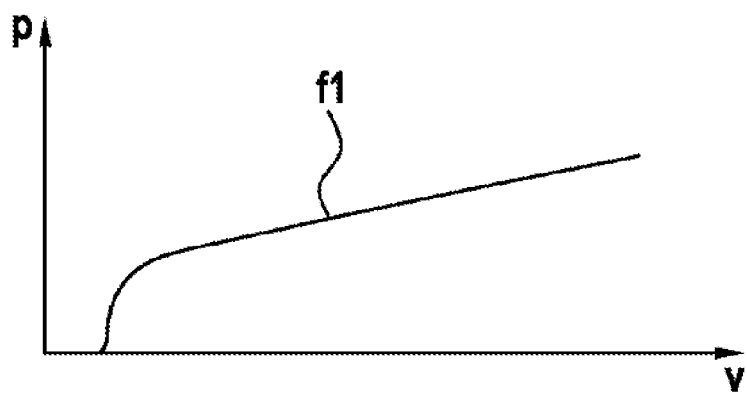
FIG. 2 shows a typical shape of a pressure/volume characteristic curve (wheel brake)

As shown in the pressure-volume diagram in FIG. 2, the greater the volume (of brake fluid) is, which is conveyed into the brakes on the front axle per unit of time, the more rapidly the brake pressure can be built up. A function f1 in the diagram therefore initially increases degressively and then transitions into a linearly increasing function. The front axle of the vehicle is highly significant for the deceleration of the vehicle in forward driving, since substantially greater braking forces can be transmitted by means of the front axle than by means of the rear axle, due to the dynamic wheel load distribution.

In order to enable use of an optimized capability of the system, a meaningful sequence of the actuator functions must be adhered to, i.e., a harmonized control of the actuators (hydraulic pump of the ESP, actuator 2 of the automatic parking brake 1) must take place, since both brake systems have advantages and disadvantages at the individual operating points.

Figure 3:
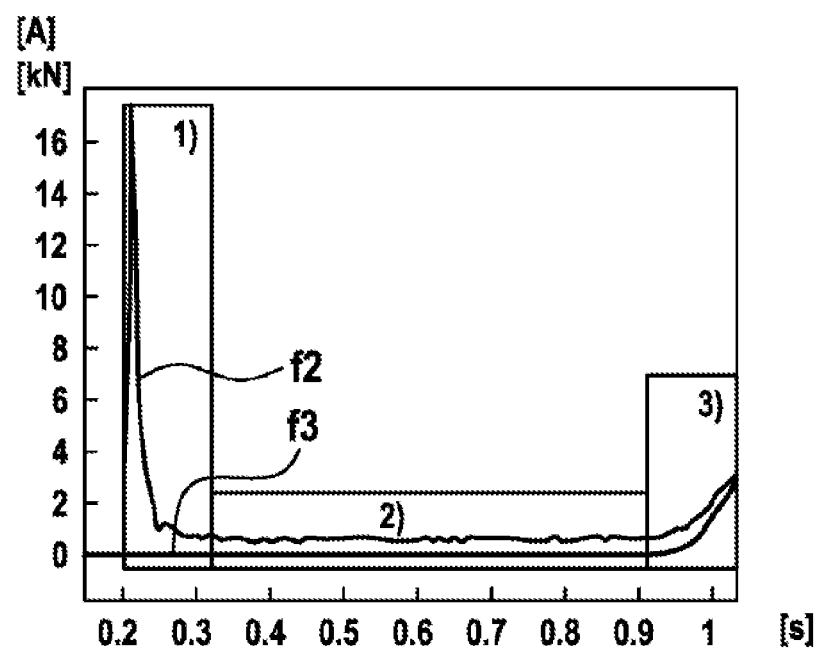
FIG. 3 shows the progressions of motor current and clamping force over time.

FIG. 3 shows a motor-current curve (function f2; unit: ampere [A]) and a clamping-force curve (function f3, unit: kilonewton [kN]) of the automatic parking brake 1. In the range 1), the actuator 2 of the automatic parking brake 1 is energized and begins to rotate and drive the spindle 3. For this reason, a peak in function f2 is apparent (above 16 amperes) here. A clamping force is not yet present here, and therefore the function f3 has the value zero in this range. In the range 2), the idle travel or the clearance of the automatic parking brake 1 is overcome. The idle travel is considered to be the distance that the spindle nut 4 must cover, via the rotation of the spindle 3, in order to come into contact with the brake piston 5. The clearance is considered to be the distance between the brake pads 8, 8' and the brake disk 7 in disk-brake systems of motor vehicles. This process lasts for a relatively long time, in general, relative to the overall control of the automatic parking brake 1 (ranges 1) to 3)). At the end of the range 2) or in range 3), the brake pads 8, 8' rest against the brake disk 7 and the force build-up begins, whereby both the function f2 of the motor current and the function f3 of the clamping force increase.

Figure 4:
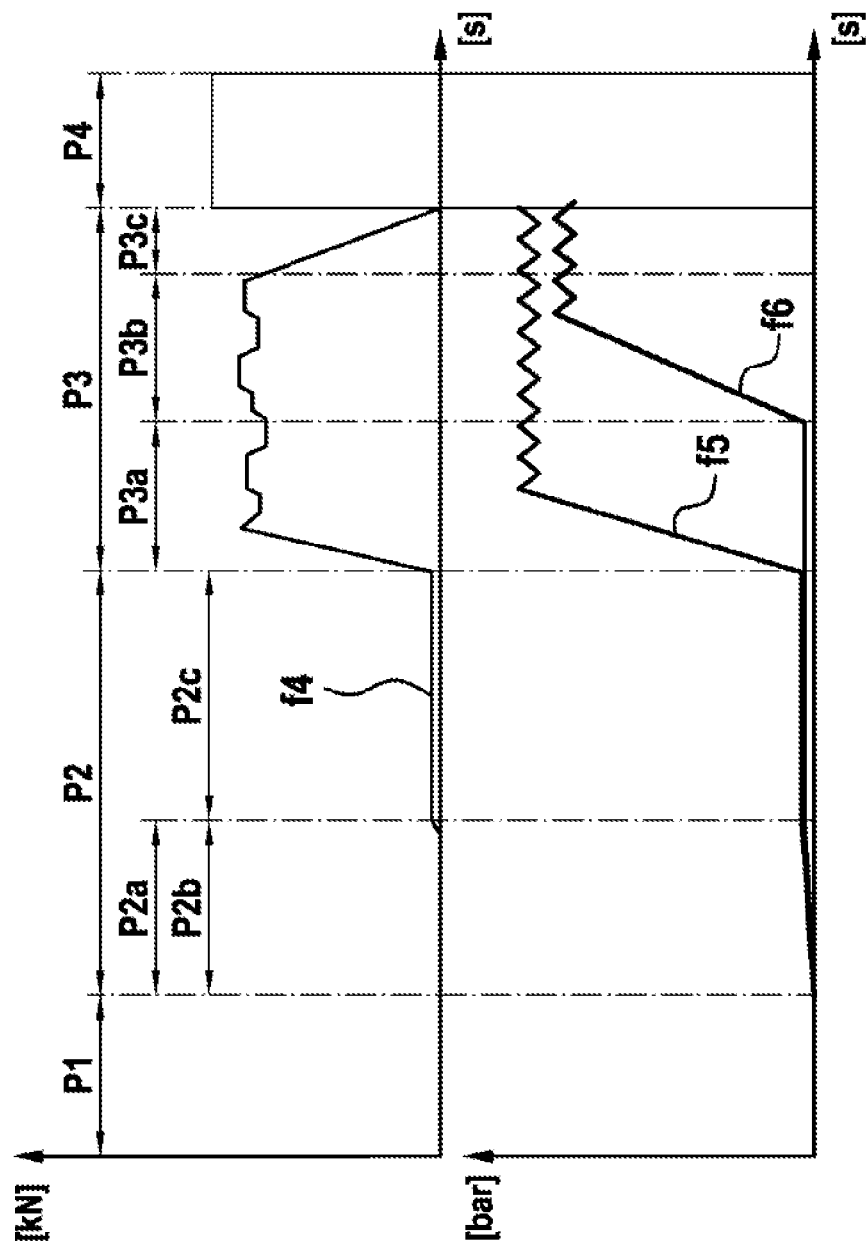
FIG. 4 shows a clamping-force progression of an automatic parking brake and the brake pressure (ESP) on the wheels on the front and rear axles according to one embodiment of the disclosure.

A sequence of emergency braking with assistance by the automatic parking brake 1 is represented in FIG. 4 and is described in detail in the following.

FIG. 4 shows a clamping force (function f4; unit: kilonewton [kN]) of the automatic parking brake 1 (top) and a brake pressure (ESP) at the front axle (function f5; unit: bar [bar]) and the rear axle (function f6; unit: bar [bar]) (bottom) over time [s]. The particular ordinates of the two diagrams in FIG. 4 and the vertical dashed lines characterize the start of the individual phases or method steps, which are described in the following. A detection phase P1 of the braking method (also referred to as the observation phase) is represented first. In a detection phase, indicators of an emergency braking situation are therefore present and are detected. Such an emergency braking situation is present, for example, when the vehicle is on a collision course with an obstacle, but the driver has not responded. In the detection phase Pl, the driver has still has time, however, to respond to the situation on his own, i.e., without intervention by an automated system. The situation detection takes place by means of the common commercially available methods (distance measurement, etc.) and will therefore not be discussed in greater detail here.

In a preparation phase P2 of the braking method, a possible intervention (emergency braking intervention) is prepared. For this purpose, the corresponding actuators, i.e, the actuator 2 of the automatic parking brake 1 and the corresponding actuator or actuators, e.g., pressure pump for hydraulic pressure, but also the valve control and valves of the hydraulic system (ESP), are prepared. The preparation phase P2 is subdivided into the steps (also referred to, alternatively, as phases) P2*a*, P2*b* and P2*c*.

In the step P2*a*, the brake pads 8, 8' are placed against the particular brake disk 7 in the brakes on the front axle and the rear axle of the vehicle by way of a pre-filling of the particular brake by means of the hydraulics (e.g., ESP). This takes place by means of the build-up of a low hydraulic pressure. Once the brake pads have been placed against the brake disk, the step P2*a* ends. A braking force applied onto the brake disk should remain as low as possible in this case. Due to the brake pads resting against the brake disk, a braking force can can build up immediately, if necessary, by means of a further hydraulic pressure build-up.

In the step P2*b*, the idle travel of the automatic parking brake 1 is overcome, i.e., the threaded nut 4 is displaced in the direction of the brake disk 7 via the rotation of the spindle 3 or the actuator 2, in order to thereby bring the spindle nut 4 in contact with the brake piston 5, and therefore the actuator 2 of the automatic parking brake 1 can also build up a braking force immediately, if necessary. In FIG. 4, the step P2*b* ends at the same time as the step P2A. Alternatively, the step P2*b* can also be terminated at another, in particular later, point in time.

In the step P2*c*, all brake pads 8, 8' have now been applied and all brakes can immediately build up a braking force on the corresponding wheel in the event of a subsequent activation. In this definition, step P2*c* starts upon completion of the step P2*a* or P2*b*, whichever one ends at a later point in time. A braking force can be built up, of course, by means of the service brake upon a further activation, e.g., upon an earlier termination of the step P2*b*, i.e., at this point in time. Upon application of the brake pads 8, 8', it is important that the braking force applied as a result be set as low as possible, in particular no braking force being generated, in order to not produce an unwanted, premature braking effect. In the upper diagram in FIG. 4, it is apparent that the clamping force of the automatic parking brake 1 is essentially zero up to the beginning of the step P2*c,* since the idle travel or clearance is overcome here. Starting at the beginning of the step P2*c*, a minimal increase in the clamping force is then evident in the function f4, which indicates the application of the brake pads 8, 8' against the brake disk 7.

In the bottom illustration in FIG. 4, it is apparent that the hydraulic pressure on the brakes on the front axle and the rear axle is built up linearly to a minimal extent here, in order to then remain constant up to the beginning of the initiation phase P3. Due to the application of all brake pads 8, 8' onto the corresponding brake disks 7, a braking torque can therefore be built up immediately at all wheels of the vehicle in the serious case.

At the beginning of the initiation phase P3 of the braking method, a collision is imminent, for example; the point of time for intervening in the braking process in an automated manner (by means of a suitable control unit) has therefore been reached. The automatic parking brake 1 (on the rear axle) and the ESP (on the front axle) build up a braking force as rapidly as possible. When an appropriate preconditions have been met, the ESP transitions into an ABS control. Likewise, the automatic parking brake transitions into an ABS control when appropriate preconditions have been met. As soon as the ABS control has been transitioned to at the brakes on the front axle, a hydraulic brake pressure is additionally built up (step P3a) at the brakes on the rear axle. As soon as the hydraulic brake pressure at the rear wheels is high enough to perform the braking of the rear wheels, the automatic parking brake 1 is released again (step P3b) and the entire braking procedure is carried out purely hydraulically from this point forward.

As soon as an ABS control has been transitioned to, a modulation of the hydraulic pressure results, for example, at the service brakes (hydraulic brakes), which is represented, in the case of the functions f5 and f6, by the typical alternating increase and decrease in the corresponding brake pressure. Reducing the brake pressure counteracts a blocking of the wheels. An alternating progression is also evident in the function f4, since a blocking of the wheels is also electronically counteracted in this case.

The initiation phase (P3) transitions into a completion phase (P4) when the emergency braking has been completely carried out or has ended. Once the automatic braking has been completely carried out and the vehicle is at a standstill, the vehicle can be held in place hydraulically and, after a defined period of time, the automatic parking brake 1 can be activated, in order to continuously and reliably hold the vehicle. If the vehicle is still traveling, for example, because the emergency braking was terminated (e.g., in the event that the obstacle disappeared or due to a take-over command from the driver), the brakes can be released at the four wheels and the vehicle can be handed over to the driver.

If the vehicle should collide with an obstacle, control can be handed over to the automatic parking brake 1, in order to reliably hold the vehicle at a standstill.

Due to the system according to the disclosure, in particular due to the symbiosis of the two braking systems, the dynamics of the pressure build-up at the front axle and the rear axle can be increased.

The invention claimed is:

1. A braking method for a vehicle comprising at least one front wheel and at least one rear wheel, wherein a front hydraulically actuatable brake is provided at the at least one front wheel and a rear hydraulically actuatable brake is provided at the at least one rear wheel, and an automatic parking brake is provided at the at least one rear wheel, the method comprising:
an initiation phase, including:
generating a first braking force at the at least one front wheel by a hydraulic brake pressure present at the front hydraulically actuatable brake, and
generating a second braking force at the at least one rear wheel exclusively by an electrical actuator of the automatic parking brake while generating the first braking force at the at least one front wheel by the hydraulic brake pressure.

2. The braking method as claimed in claim 1, wherein the initiation phase further includes:
building up a hydraulic brake pressure at the rear hydraulically actuatable brake after a defined brake pressure has been reached at the front hydraulically actuatable brake.

3. The braking method as claimed in claim 2, wherein the initiation phase further includes:
generating a third braking force at the at least one front wheel and generating a fourth braking force at the at least one rear wheel exclusively by a hydraulic brake pressure in the front and rear hydraulically actuatable brakes after a defined brake pressure has been reached in the rear hydraulically actuatable brake.

4. The braking method as claimed in claim 1, further comprising:
a preparation phase preceding the initiation phase, the preparation phase including:
placing brake pads of at least one of the front and rear hydraulically actuatable brakes against a brake disk of the at least one of the front and rear hydraulically actuatable brakes.

5. The braking method as claimed in claim 4, wherein the preparation phase further includes:
overcoming play and clearance of the automatic parking brake.

6. The braking method as claimed in claim 4, wherein:
placing the brake pads against the brake disk includes placing the brake pads such that essentially no braking force is applied or a braking force which is applied is as low as possible; and
maintaining the brake pads against the brake disk with essentially no braking force applied or with an applied braking force which is as low as possible.

7. The braking method as claimed in claim 1, further comprising:
a completion phase following the initiation phase and controlled by a control unit, the completion phase including making a distinction between:
a first situation, wherein the vehicle is hydraulically held in place and, after a defined period of time, is held in place solely by the automatic parking brake, in order to continuously and reliably park the vehicle, when the vehicle is at a standstill;
a second situation, wherein the hydraulically actuatable brakes are released and control of the hydraulically actuatable brakes is handed over to the driver if the vehicle is traveling; and
a third situation, wherein the vehicle is held in place by the automatic parking brake, in order to reliably hold the vehicle at a standstill, if a collision has occurred.

8. The braking method as claimed in claim 1, wherein initiation of the initiation phase occurs based solely upon sensor system input.

9. The braking method as claimed in claim 1, wherein:
the braking method is an emergency braking method which is initiated by a control unit as soon as predetermined indicators for an emergency braking situation are present and/or detected in a detection phase.

10. The braking method as claimed in claim 2, wherein the hydraulic brake pressure is applied to the rear hydraulically actuatable brake only after the front hydraulically actuatable brake transitions into an ABS control.

11. The braking method as claimed in claim 3, wherein the built-up brake pressure at the rear wheel is great enough to provide a required braking force.

12. The braking method as claimed in claim 7, wherein the hydraulically actuatable brakes are released and control of the hydraulically actuatable brakes is handed over to the driver in the event of a termination of an emergency braking.

13. A control unit configured to carry out a braking method for a vehicle comprising at least one front wheel at and least one rear wheel, wherein a front hydraulically actuatable brake is provided at the at least one front wheel and a rear hydraulically actuatable brake is provided at the at least one rear wheel, and an automatic parking brake is provided at the at least one rear wheel, wherein:
    the control unit is configured to carry out an initiation phase, including:
        generating a braking force at the at least one front wheel by a hydraulic brake pressure present at the front hydraulically actuatable brake, and
        generating a braking force at the at least one rear wheel exclusively by an electrical actuator of the automatic parking brake while generating the braking force at the at least one front wheel by the hydraulic brake pressure.

14. An automatic parking brake, comprising:
a control unit configured to perform an initiation phase, including:
    generating a braking force at a front wheel by a hydraulic brake pressure present at a front hydraulically actuatable brake, and
    generating a braking force at a rear wheel exclusively by an electrical actuator of the automatic parking brake while generating the braking force at the at least one front wheel by the hydraulic brake pressure,
wherein initiation of the initiation phase occurs based solely upon sensor system input.

15. The automatic parking brake as claimed in claim 14, wherein the automatic parking brake is a "motor on caliper" braking system.

\* \* \* \* \*